United States Patent [19]

Shaw

[11] Patent Number: 4,482,478

[45] Date of Patent: Nov. 13, 1984

[54] BLENDS OF BRANCHED CHAIN PHTHALATE ESTERS AND HALOGENATED BENZENE COMPOUNDS

[75] Inventor: David G. Shaw, Glens Falls, N.Y.

[73] Assignee: General Electric Company, Hudson Falls, N.Y.

[21] Appl. No.: 440,152

[22] Filed: Nov. 8, 1982

Related U.S. Application Data

[63] Continuation-in-part of Ser. No. 188,361, Sep. 18, 1980, abandoned, which is a continuation of Ser. No. 13,563, Feb. 21, 1979, abandoned, which is a continuation-in-part of Ser. No. 682,776, May 3, 1976, abandoned, which is a continuation-in-part of Ser. No. 519,944, Nov. 1, 1974, abandoned.

[51] Int. Cl.$^3$ .............................................. H01B 3/24
[52] U.S. Cl. .................................. 252/579; 252/580; 361/317; 361/318; 361/319; 361/327; 336/94; 174/17 LF; 174/23 C
[58] Field of Search ................ 252/579, 580; 361/317, 361/318, 319, 327; 336/94; 174/17 LF

[56] References Cited

U.S. PATENT DOCUMENTS

| | | | |
|---|---|---|---|
| 1,594,124 | 7/1926 | Shrader | 427/81 X |
| 1,895,376 | 1/1933 | Clark | 361/315 |
| 1,935,595 | 11/1933 | Clark | 361/317 |
| 2,084,472 | 6/1937 | Wiezevick | 361/319 X |
| 2,096,550 | 10/1937 | Jira | 361/317 X |
| 3,112,356 | 11/1963 | Cohen | 252/65 |
| 3,363,156 | 1/1968 | Cox | 361/318 |
| 3,740,625 | 6/1973 | Ross et al. | 252/579 |
| 3,754,173 | 8/1973 | Eustance | 317/258 |
| 3,811,077 | 5/1974 | Munch | 317/258 |
| 3,833,978 | 9/1974 | Eustance | 29/25.42 |
| 3,925,221 | 12/1975 | Eustance | 252/579 |
| 4,115,834 | 9/1978 | Robinson et al. | 252/580 |
| 4,117,579 | 10/1978 | Shaw et al. | 427/81 |

FOREIGN PATENT DOCUMENTS

| | | | |
|---|---|---|---|
| 446838 | 2/1948 | Canada | 252/65 |
| 2047398 | 5/1970 | France . | |
| 53-132399 | 9/1978 | Japan . | |

Primary Examiner—John E. Kittle
Assistant Examiner—Robert A. Wax
Attorney, Agent, or Firm—James J. Lichiello; Arthur E. Bahr; Ernest F. Chapman

[57] ABSTRACT

There is disclosed a fluid comprising a mixture of about 5 percent to about 40 percent by volume of a halogenated benzene and about 60 percent to about 95 percent by volume of an alkyl branched chain phthalate ester, said fluid having a dielectric constant greater than the dielectric constant of either of the halogenated benzene or the alkyl branched chain phthalate ester. The dielectric constant of an alkyl branched chain phthalate ester having a dielectric constant above about 4.0 is increased by mixing a halogenated benzene having a dielectric constant above about 4.0 with the alkyl branched chain phthalate ester whereby the measured dielectric constant of the alkyl branched chain phthalate ester having the halogenated benzene therein, is at least 0.25 higher than the dielectric constant of either the halogenated benzene or the alkyl branched chain phthalate ester. The preferred halogenated benzene is trichlorobenzene, and the preferred alkyl branched chain phthalate ester is di-2-ethylhexylphthalate.

28 Claims, 9 Drawing Figures

BLENDS OF BRANCHED CHAIN PHTHALATE ESTERS AND HALOGENATED BENZENE COMPOUNDS

CROSS-REFERENCE TO RELATED APPLICATIONS

This application is a continuation-in-part application of copending application Ser. No. 188,361 filed Sept. 18, 1980, now abandoned which in turn, was a continuation copending application Ser. No. 13,563 filed Feb. 21, 1979, now abandoned, which was a continuation-in-part application of copending application Ser. No. 682,776 filed May 3, 1976, now abandoned, which in turn, was a continuation-in-part application of copending application Ser. No. 519,944 filed Nov. 1, 1974, now abandoned, and assigned to the same assignee as the present invention.

BACKGROUND OF THE INVENTION

This invention relates to blends of phthalate esters, and halogenated benzene compounds, and more particularly, relates to compositions of branched chain phthalate esters and halogenated benzene compounds and to a method for controlling the dielectric constant of phthalate ester blends.

The compositions of this invention have utility in devices and methods which require stable fluids having a high dielectric constant. For example, the blends of alkyl branched chain phthalate esters and chlorinated benzene compounds may be used as a dielectric liquid to improve electrical capacitors. The uses of the fluid blends of the present invention are described in greater detail below.

U.S. Pat. No. 3,363,156, Cox, discloses and claims various types of dielectric liquid impregnated electrical capacitors. The dielectric liquid composition described in Cox is a chlorinated hydrocarbon, more particularly, a halogenated aromatic hydrocarbon and specifically a chlorinated diphenyl. The chlorinated diphenyl impregnants for electrical capacitors were commercially available under the trademark Aroclor, a trademark of the Monsanto Company, a specific example being Aroclor 1242 or Aroclor 1016. The chlorinated diphenyls, referred to as PCB's, have recently have associated with ecological problems, and accordingly, there is a continuing search for new and improved impregnants in the electrical field.

In U.S. Pat. No. 3,754,173, Eustance, the substance of which is incorporated herein by reference, there is disclosed an epoxide stabilized liquid aromatic ester impregnant which obviates many of the PCB ecological disadvantages. For example, Eustance discloses and claims the use of an epoxide with dioctyl phthalate. More importantly, however, is the fact that this unique combination has proved effective in electrical capacitors in many of the applications formerly served with chlorinated diphenyl capacitors.

In high voltage capacitor applications it was found that the aromatic esters in accordance with the Eustance patent will provide very high corona start voltages (CSV) and therefore favorably compare with the chlorinated diphenyl liquids for capacitors. However, a further important voltage level or criteria of a capacitor is referred to as the corona extinction voltage (CEV) of a capacitor. The corona start voltage and the corona discharge may commence in a capacitor and be extinguished respectively during a rising and decreasing voltage level across the capacitor. In high voltage power factor correction capacitors, the corona extinction voltage for the ester impregnants has been found to be significantly less than the corona extinction voltage for the chlorinated diphenyl type impregnants.

Additive liquids used to minimize the foregoing problems have been found in many cases to have adverse affects on other characteristics of the impregnant, such as, lowering the dielectric constant (DK), whereas the primary desire is to stabilize or increase the DK and the CEV. In addition to the foregoing problems, many of the ester impregnants, particularly those of higher molecular weights, are otherwise desirable for capacitor impregnants but have an increased viscosity which creates a problem in essentially completely impregnating a capacitor in accordance with the teachings of the above noted Cox patent.

There have been many attempts in the prior art to overcome these problems by resorting to mixtures of esters with chlorinated and other compounds. At first these efforts were directed to the use of chlorinated compounds for mixing with other fluids, notably esters. Those mixtures provided little, if any, unobvious improvements in electrical characteristics. The dielectric constants of the mixtures followed the well known mixing rules in that the dielectric constant of mixtures do not exceed the dielectric constant of the components, and other electrical characteristics were unimportant. Mixing became an acceptable practice for physical modifications of such characteristics as viscosity and solubility. See, for example, U.S. Pat. No. 3,112,356, Cohen, disclosing chlorinated aromatic compounds for mixing with monocarboxylic acid esters, without any particular reason for doing so, or U.S. Pat. No. 2,096,550, Jira, disclosing the use of an ester of phthalic acid in combination with halogenated cyclic hydrocarbon compounds and particularly the chlorinated diphenyl compounds.

More recently, the prior art has made an effort to find mixtures with improved electrical characteristics, such as dielectric constants and CSV. See, for example, U.S. Pat. No. 3,811,077, Munch, where a very high dielectric constant sulfone fluid is mixed with an ester to raise the dielectric constant of the mixture above that of the ester, but not of the sulfone, or British Pat. No. 1,428,741 where an ester is mixed with a diphenyl oxide to provide a fluid comparable to chlorinated diphenyl with a resultant dielectric constant of the mixture less than that of the ester.

While the chlorinated compounds generally were most desirable for mixing with esters for physical modifications, the polychlorinated diphenyl compounds were not desirable, and the reactions of non-diphenyl chlorinated compounds with the more desirable esters were relatively unknown, unpredictable, or contributed little besides physical changes. As a consequence, there was little, if any, motivation to proceed with such mixtures, and the art turned to various hydrocarbons for newer fluids. However, stabilization of, or an increase in, the corona extinction voltage and dielectric constant of a mixture which includes an acceptable chlorine compound with a desirable ester, would be most important.

OBJECTS OF THE INVENTION

Accordingly it is an object of this invention to combine certain esters and certain chlorinated compounds into mixtures having increased corona extinction voltages and dielectric constants above the dielectric constants of the components of the mixture.

Another object of the present invention is to provide a method for increasing the dielectric constant of alkyl branched chain phthalate esters.

Still another object of the present invention is to provide a method of controlling the dielectric constant of a blend of a halogenated benzene and an alkyl branched chain phthalate ester.

SUMMARY OF THE INVENTION

These and other objects of the invention are accomplished by a fluid comprising a mixture of about 5 percent to about 40 percent by volume of a halogenated benzene and about 60 percent to about 95 percent by volume of an alkyl branched chain phthalate ester, said fluid having a dielectric constant greater than the dielectric constant of either of the halogenated benzene or the alkyl branched chain phthalate ester. The fluid may further comprise an epoxide and/or antioxidant.

In accordance with an exemplary practice of this invention, a dielectric liquid composition comprises a predetermined mixture of a branched chain aromatic ester and chlorinated benzene compounds. This mixture, having a dielectric constant above that of its constituents may be used to impregnate a polypropylene film electrical capacitor and provide an improved corona extinction voltage characteristic and decreased flammability therein. One working example of this invention utilizes a mixture of a liquid phthalate ester, such as dioctyl phthalate, or di-2-ethyl-hexyl phthalate (DOP), and trichlorobenzene (TCB) as the impregnant for an electrical capacitor.

In one aspect of the present invention, there is provided a method of increasing the dielectric constant of an alkyl branched chain phthalate ester having a dielectric constant above about 4.0 comprising mixing an effective amount of halogenated benzene having a dielectric constant above about 4.0 with the alkyl branched chain phthalate ester whereby the measured dielectric constant of the alkyl branched chain phthalate ester having the halogenated benzene therein, is at least 0.25 times higher than the dielectric constant of either the halogenated benzene or the alkyl branched chain phthalate ester. In preferred embodiments, about 5.0 percent to about 40.0 percent by volume of halogenated benzene is mixed with the alkyl branched chain phthalate ester. In one preferred embodiment about 5.0 percent to about 40.0 percent by volume of trichlorobenzene is mixed with about 60.0 percent to about 95.0 percent by volume of di-2-ethylhexylphthalate. An effective amount of halogenated benzene is defined herein as that amount of halogenated benzene which will increase the dielectric constant of the alkyl branched chain phthalate ester, having the halogenated benzene therein, at least 0.25 times higher than the dielectric constant of either the halogenated benzene or the alkyl branched chain phthalate ester.

In another aspect of the present invention, there is provided a method of controlling the dielectric constant of a blend of a halogenated benzene having a dielectric constant above about 4.0 and an alkyl branched chain phthalate ester having a dielectric constant above about 4.0 comprising varying the ratio of the halogenated benzene in the blend relative to the amount of alkyl branched chain phthalate ester therein, said blend having a dielectric constant greater than the dielectric constant of either of the halogenated benzene or the alkyl branched phthalate ester. In certain preferred embodiments of this aspect of the invention, the ratio of trichlorobenzene is varied between about 5.0 percent and about 40.0 percent by volume relative to the volume of the alkyl branched chain phthalate.

Further objects of this invention together with additional features and advantages thereof will become apparent from the following detailed description of various embodiments of the invention when read in conjunction with the accompanying drawings.

BRIEF DESCRIPTION OF THE DRAWINGS

This invention will be better understood when taken in conjunction with the following descriptions and the drawings in which.

DESCRIPTION OF THE PREFERRED EMBODIMENTS

It has been discovered that alkyl branched chain phthalate esters exemplified in the above-noted Eustance patent may be greatly improved when a halogen-containing benzene compound is added to the ester. The halogen-containing benzene entity blended with the phthalate ester raises the corona extinction level of various devices, such as capacitors, increases the dielectric constant of a dielectric system while at the same time advantageously improves the anti-flammability characteritics of the fluid, and reduces the viscosity of the fluid.

In high voltage capacitor applications the branched chain aromatic esters evidence a very high corona start voltage, a critical requirement when the esters are used as an impregnant. It is expected that capacitors, during their operating life, are subjected to certain transient overvoltage conditions which could cause a corona discharge within the dielectric. However, with an impregnant such as a chlorinated diphenyl, this corona is extinguished as soon as the transient voltage has passed or as soon as the transient voltage has reduced to a certain degree. In an effective impregnant, such as chlorinated diphenyl, the voltage level at which the corona is extinguished (CEV), is very close to that level at which corona originates. This is known as a high corona extinction voltage, and a high corona extinction voltage is required in order to prevent the lingering corona from seriously injuring the capacitor, but more importantly, to extinguish the corona when the voltage drops to the ordinary operating voltage of the capacitor.

When 1,3,4-trichlorobenzene (TCB) is added to dioctyl phthalate (di-2-ethylhexyl phthalate) (DOP), there is an increase in the dielectric constant of the mixture and an increase in the corona extinction value of capacitors containing the mixture. More specifically, it was found that the addition of at least about 10% by volume of TCB, to DOP where the TCB is an admixture and is not combined with the DOP, is a sufficient amount to provide a significantly improved dielectric constant and corona extinction voltage of the mixture which are close to those of the biphenyl compound, Aroclor 1016, one of the more common chlorinated diphenyl impregnants previously utilized in the capacitor industry. As low as an added amount of about 5% TCB by volume still results in a measured improvement to these characteristics.

Figure 1:
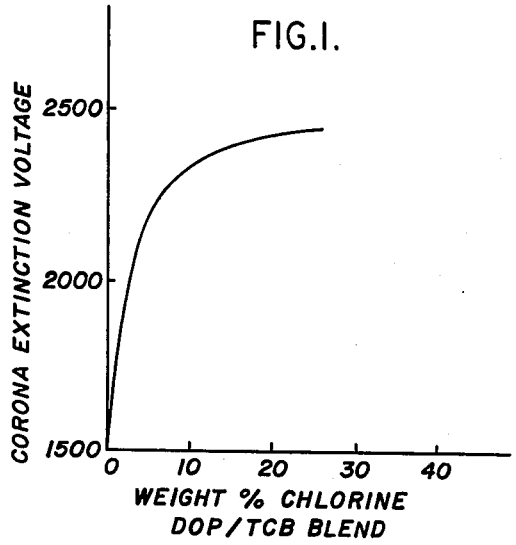
FIG. 1 is a curve showing the increase in the corona extinction voltage (CEV) of capacitors containing DOP-TCB mixtures.

Representative mixtures of this invention were utilized as impregnants in capacitor embodiments, and the corona extinction values (CEV) of the capacitors were obtained as more clearly shown in FIG. 1. Referring to FIG. 1, the curve of the CEV versus the weight percent of chlorine in a DOP/TCB blend is illustrated as a curve which rises from about 1500 volts to about 2350 volts at the highest point. It is to be noted that the increases in CEV are most pronounced at about 8% through 12% by volume with very little increase after about 20% by volume of TCB has been added to the mixture. The 10% TCB by volume provides a significant increase in the overall CEV, which approaches that the biphenyl compound, Aroclor 1016. TCB, which is a chlorinated fluid, is electronegative, and this characteristic may be of significant assistance in the quenching of a corona arc. The character of the corona pulse noted during these tests is also improved by the addition of TCB. In DOP capacitors, the corona pulses break in very suddenly at high level (about 100 picocoulombs). In capacitors with the DOP/TCB blend, on the other hand, the corona breaks in at a low level which increases in a controlled fashion as the voltage is increased. As the voltage is decreased, the level of the DOP/TCB pulses decrease rapidly and extinguish at about the same point at which it appeared, while on the other hand, the DOP pulses persist at a high level up to the extinguishing voltage. Corona extinction voltage is measured much in the same way and by the same equipment which is used to measure corona start voltage. It usually involves an amplified testing circuit which displays the presence of electrical discharges within the insulation system on a cathode ray oscilloscope. The corona measuring equipment utilized in the invention had a sensitivity of one (1.0) picocoulomb.

An increase in the corona extinction voltage is a significant advancement because it permits a given capacitor to be utilized in applications which require a high extinction voltage. In the past, most high voltage AC capacitors utilized solely a paper dielectric with such impregnants as chlorinated diphenyl and mineral oil. With chlorinated diphenyl impregnants the corona extinction voltages were inherently of a high order. However, with mineral oil the capacitors utilized thicker dielectrics and low stresses to compensate for the lower corona extinction values. In the capacitors of this invention, the very high stresses employed, e.g., above 1000 volts per mil (25.4 microns) thickness of polypropylene film, together with thinner dielectrics, e.g., less than about 1.5 mil (3.81 microns) thickness between electrodes, require a high corona extinction voltage in order to be effective, and increasing the dielectric thickness to lower the stresses does not in turn suggest the use of the blends of this invention. For example, in a given prior art capacitor design of thicker paper dielectrics and lower stresses, substitution therein of the present blend would be meaningless, and the advantages of the present blend as an impregnant would neither be used nor recognized.

Surprisingly enough, it was discovered that the mixtures (blends) of this invention also exhibited a dielectric constant which was significantly greater than the dielectric constant of either DOP alone or the TCB alone. Dielectric constant (DK) is the ratio of the capacitance of a given structure with the dielectric liquid as compared to the capacitance of that structure with air as the dielectric medium. The value obtained is qualified with reference to the conditions of measurement (voltage, frequency, and temperature). The dielectric constant (DK) of the preferred aromatic esters, the Aroclors (chlorinated diphenyls), and TCB are desirably high so that the expected result of mixing of these liquids would be a somewhat average DK. The dielectric constant of a mixture is usually calculated by the use of a linear dielectric constant mixing rule or a logarithmic dielectric constant mixing rule 1,2. However, the behavior of the mixtures of the present invention appears to be an exception to both rules. This synergism which is noted to be most significant for the dioctyl phthalate and trichlorobenzene mixtures, is not readily explained by previous experiences with dielectric mixtures. The synergism of an increased dielectric constant above the expected mixing rule was confirmed by testing of DOP mixtures with other chlorinated compounds.

Figure 2:
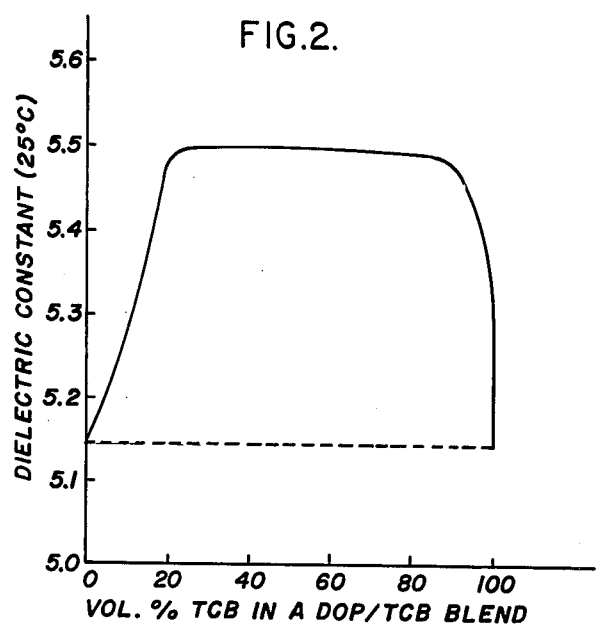
FIG. 2 is a curve showing the increase in dielectric constant of DOP-TCB mixtures.

The linear dielectric constant mixing rule as defined in both cited references by appropriate equations, is intended to mean the relatively straight line function, i.e. the dashed line of FIG. 2. As hereinafter referenced, Dielectric Constant Mixing Rule refers to the rules noted in the above-cited references and in this specification. For the purposes of this invention, a DK higher than that calculated by the Dielectric Constant Mixing Rule is a DK whose value is significantly above that indicated by the dashed line regardless of the slope or initial height of the dashed line, and the DK of the mixtures or blends of this invention are higher than that of the components. The basis for the straight line function is derived from the equations given and whether or not the line is precisely straight is of no importance. This invention describes a DK greater than that predicted by the noted equations.

Several mixtures were studied under conditions of 25° C. and at a frequency of 1000 Hertz, and their dielectric constants are more clearly shown in FIG. 2. Referring now to FIG. 2, there is disclosed a volume percent TCB in DOP/TCB mixtures as compared with the DK value of the mixtures. It can be seen that at about 20% of TCB in the mixture, a maximum DK of about 5.5 is reached. This DK does not seem to be affected by further increases in the amount of TCB. The DK expected, from linear or logarithmic mixing rules for these mixtures, would be about 5.15 as indicated by the dashed line. The high DK figure of 5.5 is compared to the DK of about 5.15 to 5.2 for either of the TCB or the DOP material alone. The curve of FIG. 2 shows a DK higher than either component. However, when one of the components has an initial DK which is much lower than the other component, the DK curve will be higher than the noted mixing rules predict although the mixture will not exhibit a DK higher than either component. A higher DK means more capacitance per unit volume of the capacitor or, a smaller capacitor for the same required capacitance. The ultimate capacitor design utilizes this increased DK in its application. More importantly, FIG. 2 indicates that where two materials of similar DK's, i.e., DOP and TCB are brought together, the resulting DK of the mixture is higher than the original DK of either component. Where one component has a DK significantly lower than the other, the foregoing results have not been obtained. Best results are obtained when the trichlorobenzene involves a mixture of the 1-2-4 and the 1-2-3 isomers in a range of about 70% for the former, and about 25% for the latter. The remaining 5% is accounted for by various impurities.

Thus, in one preferred embodiment, when the halogenated benzene is trichlorobenzene, and the alkyl branched chain ester is di-2-ethylhexylphthalate, about 5.0 percent to about 40.0 percent by volume of trichlorobenzene consisting essentially of about 70 percent by volume of 1,2,4-trichlorobenzene and about 25 percent by volume of 1,2,3-trichlorobenzene, is mixed with about 60.0 percent to about 95.0 percent by volume di-2-ethylhexylphthalate. Furthermore, when the halogenated benzene is trichlorobenzene, and the alkyl branched chain phthalate ester is di-2-ethylhexylphthalate, the ratio of trichlorobenzene consisting essentially of about 70 percent by volume of 1,2,4-trichlorobenzene and about 25% by volume of 1,2,3-trichlorobenzene, is varied between about 5.0 percent and about 40.0 percent by volume relative to the volume of the di-2-ethylhexylphthalate. The lower DK trichlorobenzenes, such as the 1-2-3 isomer, are not preferred, nor are the higher DK chlorobenzenes. The DK for both components should be in the range of about 4–6.

Thus, in certain embodiments, the dielectric constant of the halogenated benzene is above about 4.0; the dielectric constant of the alkyl branched chain phthalate ester is above about 4.0; and the dielectric constant of the mixture is at least 0.25 times higher than the dielectric constant of either the halogenated benzene or the alkyl branched chain phthalate ester. In other embodiments, the dielectric constant of the halogenated benzene is between about 4.0 and about 6.0; the dielectric constant of the branched chain phthalate ester is between about 4.0 and about 6.0; and the measured dielectric constant of the blend is at least 0.25 times higher than the dielectric constant of either the halogenated benzene or the alkyl branched chain phthalate ester.

It is believed that the unexpectedly large increase in DK is also attributable to the fact that the chlorinated (halogenated) material is a chlorinated benzene and is added to a branched chain ester, such as DOP. It is this kind of combination which maximizes the synergistic effect of the DK to the point that it is raised above about 0.25 times higher than the DK value of either component. Tests performed with TCB and other nonbranched chain esters, such as castor oil and diamyl phthalate, benzyl benzoate, and tests with other chlorinated compounds, such as mono- and di-chloronaphthalene failed to show the kind of increase of DK as shown in FIG. 2 or any DK higher than those of the components.

Care should be taken that other liquids are not added to the mixture which will negate the DK increase. For example, adding decene to a mixture of trichlorobenzene and DOP will remove the DK increase. The DK increase is thus not an inherent item which might be only masked by other characteristics but is one which can be removed.

Various mixtures of DOP and TCB were made up and utilized in representative type capacitors. It was noted during the course of this work that the TCB reduced the viscosity of the DOP and thus facilitated impregnation, particularly in all film capacitors. Accordingly, where many of the esters are more undesirable because of their high viscosity, the addition of TCB may reduce that viscosity to more desirable and appropriate levels.

Figure 3:
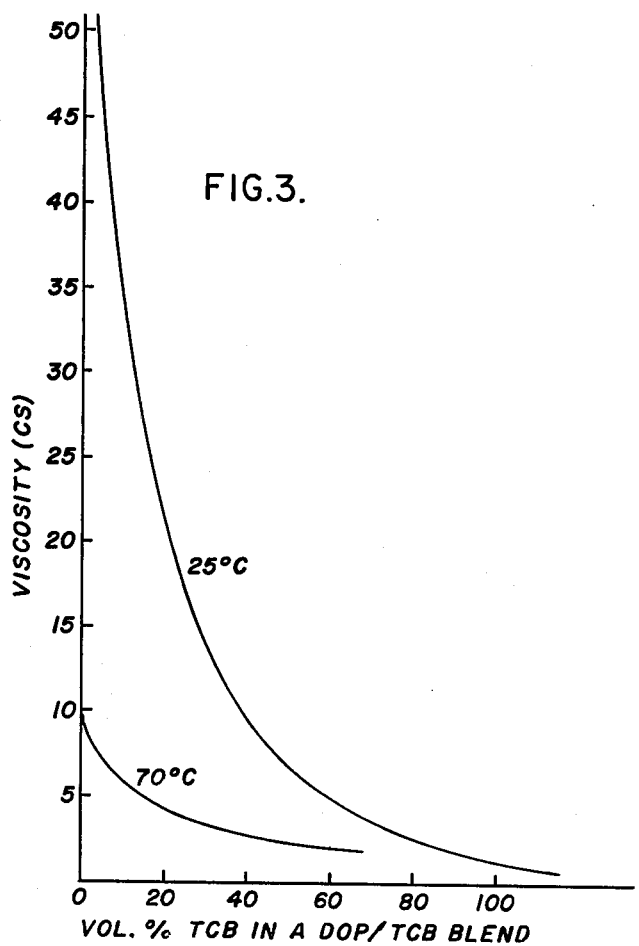
FIG. 3 is a curve showing the viscosity of DOP-TCB mixtures.
Figure 4:
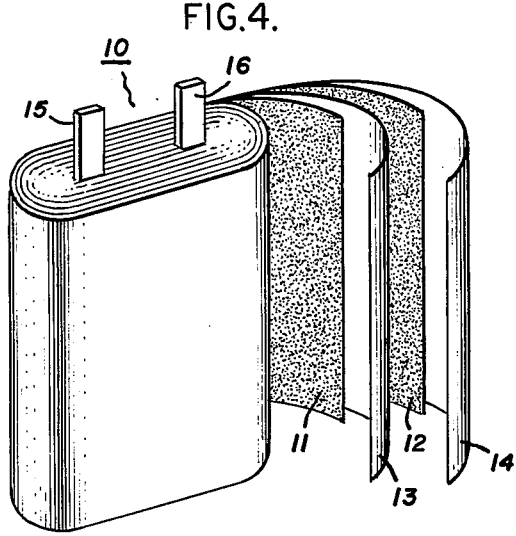
Figure 8:
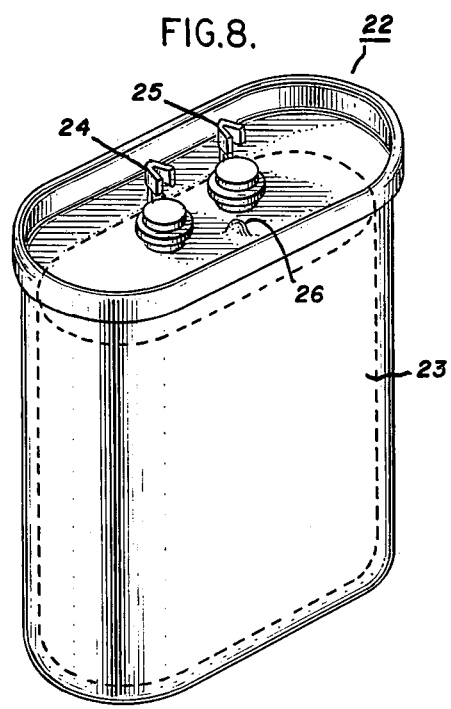
Figure 5:
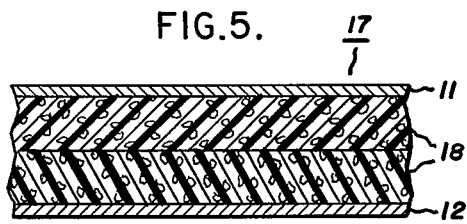
Figure 6:
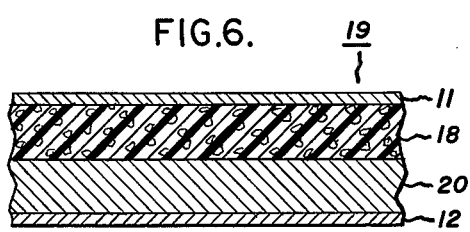
Figure 7:
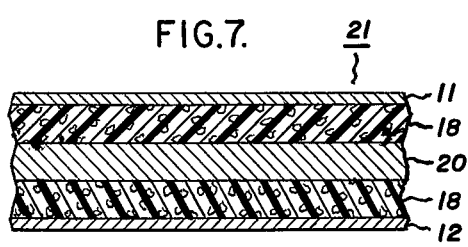
Figure 9:
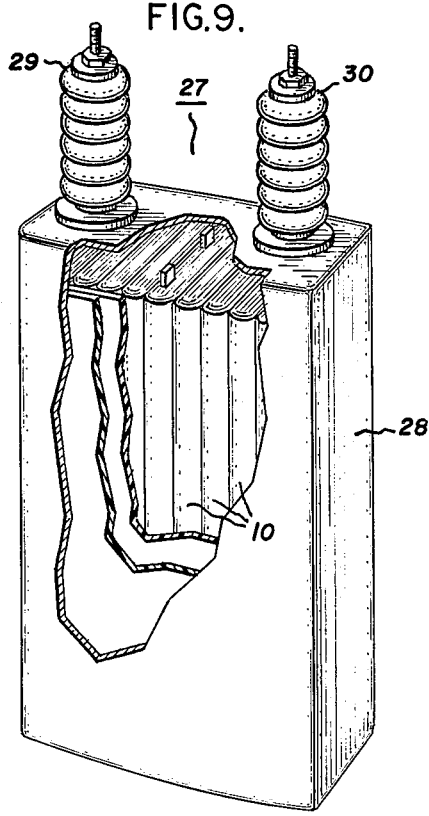

One example of the viscosity lowering ability of TCB in DOP is shown in FIG. 3. In FIG. 3, the curves show that the viscosity of the mixture decreases quite rapidly with increasing amounts of TCB at room temperature conditions or 25° C. At 70° C. it is noted that the viscosity decreases less rapidly with increasing amounts of TCB since at this temperature the viscosity of the DOP is already low. By comparison, the viscosity of the more common chlorinated diphenyl impregnant, Aroclor 1016, is about 45 centistokes at 25° C.

Mixtures of DOP and TCB were also tested for their flame retardant characteristics. These tests show that the ability of the DOP to sustain combustion is lessened by the addition of the TCB, and, therefore, the TCB addition is quite favorable for capacitor operation where a high degree of inflammability is desired. For example, it was found that DOP has a fire point, the point at which DOP will sustain flame, at about 240° C. However, a 70% DOP + 30% TCB mixture had no fire point up to about 265° C.

Preferred capacitor structures embodying this invention are discussed below and in the prior art. A capacitor comprises a typical roll section comprising alternate electrode foils and dielectric strips. The strips may be single strips of paper or a synthetic resin, plural strips of these materials, or composite strips. The electrode foils may also be formed as metallized coatings on the strips or on separate and additional strips of various dielectric materials. Suitable electrical connectors in the form of tabs are utilized to connect the electrode foils to appropriate capacitor terminals.

The dielectric structure for the roll section may include various well known composites. In the all film roll structure only a synthetic resin film, such as polypropylene film, is used as the sole dielectric between electrodes. A typical all polypropylene film capacitor will utilize one or more polypropylene film strips between the electrodes.

One form of a mixed dielectric roll structure for a capacitor uses dissimilar dielectrics, such as synthetic resin film or a paper strip, although different resin films may be employed as a composite, such as a polypropylene film and a polyester film. A roll structure, described as a semi-sandwich construction, uses one or more paper strips with one or more synthetic resin film strips.

A further mixed dielectric roll structure, referred to as an inverted sandwich structure, the primary characteristic of which is that of a synthetic resin film, is used adjacent each foil, and there are one or more intermediate dissimilar strips which are usually employed as a combined dielectric and wicking strip. In a preferred form of this embodiment, the intermediate strip is a single paper strip, and the synthetic resin strips are single polypropylene strips.

One or more of the roll sections, including the roll structure of one or more sandwich structures, are assembled in cans or casings, impregnated with the impregnant blends or mixtures of this invention, and then sealed.

Another type of capacitor is referred to as a motor start or motor run capacitor. Such a capacitor usually includes a single roll section which is inserted into a metal casing and sealed therein. The tabs of the roll section are connected to external capacitor terminals. The metal casing is filled with the impregnant of this invention through fill hole means which may be solder sealed.

Plural and larger roll sections are used in capacitors referred to as power capacitors or power factor correction capacitors. Such capacitors usually include a large rectangular steel casing which may be from ½ to 1 meter in the longer dimension. The casing includes therein a row of longer roll sections whose connectors are suitably connected to external capacitor terminals. The casing may be filled with the impregnant of this invention.

A number of capacitors were made up for testing purposes of this invention. A typical test capacitor involved a roll section, as described above, assembled as a motor run capacitor. In a first test capacitor, the strips were composite strips comprising a pair of polypropylene strips and intermediate paper strips. In the examples used for testing the blends of this invention, the polypropylene comprised two strips of about 0.47 mil. (1.2 mm) thick polypropylene and one sheet of 0.50 mil. (1.27 mm) paper. The overall capacitor height was about 4 in. (10.16 cm). In a second capacitor structure made for the purposes of testing the blends of this invention, the dielectric strips each comprised a pair of paper strips 20, one of which was about 0.60 mil. (1.55 mm) thick paper and the other which was 0.65 mil. (1.68 mm) thick paper. These capacitors were impregnated in accordance with the general impregnation cycle as set out in the Cox 3,363,156 patent which comprised drying the capacitors in a vacuum oven at temperatures up to and including 105° C. and then cooling the capacitors to less than 100° C. so that they may be filled with a dielectric liquid at about 65° C. to 75° C. Thereafter, the capacitors were sealed and permitted to heat soak overnight, i.e., about 14 to 16 hours, in a forced circulation oven at about 95° C. Testing of these capacitors of the first described kind indicated the following corona start voltage levels as set out in Table I.

TABLE I

| Dielectric Composition | CSV (Avg. of 5) | Minimum |
|---|---|---|
| 95% DOP/5 TCB | 3020 | 2900 |
| 90% DOP/10 TCB | 2912 | 2850 |
| 80% DOP/20 TCB | 2870 | 2750 |
| 60% DOP/40 TCB | 2950 | 2850 |

Ten of the capacitors from Table I which included the 60% DOP/40% TCB blend, were put on life test at 2650 VAC (volts alternating current) at 70° C. There were no failures after 400 hours as compared with three failures in DOP capacitors without TCB, and zero failures in capacitors impregnated with the biphenyl compound, Aroclor 1016.

Corona tests performed on capacitors comparing the blends of this invention and the prior art chlorinated diphenyls can be described as follows. Using a capacitor embodying a sandwich structure described above together with a chlorinated diphenyl known as Aroclor 1016, a product of Monsanto Co., the room temperature CEV is found to be about 80% of the CSV. Using DOP alone, in the same structure the CSV is found to be about 80% of that for Aroclor 1016, and the CEV is about 50% of that of CSV. Using the impregnant of the present invention in the same structure it is found that the CSV now exceeds the CSV for 1016 Aroclor, and the CEV is above 80% of the CSV.

It has been found in the practice of this invention that some form of electrical stabilizer is desirable in the impregnant mixture. Recently, the epoxide compounds have been found to be particularly effective with chlorinated diphenyl compounds and also with ester compounds although the reactions of neither addition are well understood. The epoxides are the preferred stabilizers for the blends of the present invention, and they perform a stabilizing function in the presence of both an aromatic ester liquid and a chlorinated compound without any adverse effects from the component mixtures. The liquid impregnant from the capacitors of Table I above included about 0.3 percent of 1-epoxyethyl-3,4-epoxycyclohexane. Generally, an effective amount of the epoxide compound, that is, an amount sufficient to stabilize the blend, may be added to the blend. About 0.2% to about 2.0 percent by volume may be added to the blend for best results.

While the power factor stabilizer is preferably an epoxide material, other such stabilizers, such as the anthraquinones, may be utilized but with apparently less effect than the epoxide as disclosed in the Eustance patent. On the other hand, some of the anthraquinones, such as the monochloroanthraquinones and the dichloroanthraquinones, include a significant amount of the chlorine which appears to be the necessary ingredient in the impregnant of this invention.

Conventional antioxidants may also be added in an effective amount to the blends of the present invention as long as they do not adversely alter the dielectric constant thereof. The amount of antioxidant is not critical as long as oxidation of the components is reduced or prevented. Generally, about 0.1% to about 1.0% by volume of antioxidant is added to the blends of the present invention.

The dielectric liquid composition of this invention is more specifically related for use in electrical devices such as electrical capacitors. For that reason, the components, particularly the halogen component, should be chosen to be capacitor compatible with various capacitors whether of the small motor run kind or the large power factor correction kind. Compatibility means a material which is non-reactive stable not only under the operating conditions and environment of the capacitor but also with respect to capacitor materials, such as, for example, copper, aluminum, steel, paper and synthetic resins.

This invention may be separated into certain well-defined categories, each of which relate to the addition of a halogen containing benzene compound to an ester based dielectric liquid, particularly adaptable as an electrical capacitor impregnant. In a preferred embodiment the ester is an alkyl branched chain phthalate aromatic ester. For the purposes of this invention, an aromatic ester is one which is produced from both an aromatic acid and an aromatic alcohol. However, as in the case of some esters, including DOP, the acid is aromatic but the alcohol is aliphatic. The end product, however, is denoted as an aromatic ester for the purpose of this invention. The aromatic content is significant and has a significant effect on impregnant characteristics. The same is true for an ester of an aromatic acid and an aliphatic alcohol. Where both constitutents are aliphatic, the resulting ester is denoted aliphatic rather than aromatic. Preferred esters for use in this invention are the aromatic branched chain phthalate esters disclosed in U.S. Pat. Nos. 3,754,173 and 3,833,978, Eustance, both assigned to the assignee of the present invention, and particularly the di-2-ethylhexylphthalate esters including the di-isophthalates.

The alkyl group or groups of the alkyl branched chain phthalate esters of this invention are not critical as long as the resulting ester is a liquid, and as long as the resulting blend with a halogenated benzene has a dielectric constant which is at least about 0.25 times higher than the dielectric constant of any of the components of the blend. The same alkyl group or mixtures of alkyl groups may form the ester groups on the dicarboxylic portions of the aromatic ester, as long as they form a branched chain thereon. Preferred branched chain alkyl groups include those having about four carbon atoms to about sixteen carbon atoms.

Best results have been obtained in the practice of this invention when the phthalate ester is the major component, and a separate component, such as a halogenated benzene, e.g. trichlorobenzene, is mixed therewith. The chlorine (halogen) is attached to the mixing component and not to the base ester so that the chlorine (halogen) compound is in admixture relationship to the ester.

The halogen-containing benzene compounds of this invention may be suitable compounds from the chlorinated, fluorinated, brominated, and the like, compounds. Further examples of such halogenated benzene compounds may include, for example, dichlorobenzene, difluorobenzene, dibromobenzene, and monochlorobenzene. Preferred compounds are the chlorinated benzenes, such as TCB and tetrachlorobenzene. PCB's (chlorinated diphenyls) are excluded.

It is a preferred concept of this invention that the phthalate ester be the predominant liquid or component, i.e., the basic liquid for impregnation purposes. This means that ordinarily the ester is the greater amount by volume or weight in the mixture as compared to any other component. In a capacitor environment, the basic electrical characteristics, such as the dielectric constant and dissipation factor, would be primarily based on the ester as the predominant liquid. One or more phthalate esters make up one or more components, and one or more non-ester chlorinated benzene compound, such as TCB, is another component. A stabilizer is not considered as a component. While some mixtures may contain three or more components, the foregoing description of a two component system remains the preferred one.

The presence of polypropylene film in a capacitor indicates, as herein described, a thin dielectric under very high voltage stresses. These capacitors are usually impregnated with a chlorinated diphenyl which inherently provides a high corona start and extinction voltage. The substitution of different and less effective fluids in this kind of capacitor leads to immediate recognition of faults such as a low corona extinction voltage. While the usual solution is to increase the dielectric thickness and lower the stress, the mixture of this invention obviates the redesign while at the same time providing an impregnant which is not a chlorinated diphenyl. The alkyl branched chain phthalate ester and the halogenated (chlorinated) benzene is the most effective mixture for this purpose.

In order to increase the benefits to be obtained by the use of the present invention, it is preferable to utilize a highly refined and pure fluid. One process by which high purity fluid is obtained, is to refine the components separately, e.g., the ester and the benzene compound. These materials are each refined in the presence of an antioxidant to a low dissipation factor (tan $\theta$) level at no less than about 1 to 2% at 100 Hz and room temperature, then mixed to provide a fluid containing an ester, a benzene, an epoxide, and an antioxidant and used to impregnate an AC capacitor containing polypropylene film which will operate under stresses of greater than about 1000 volts per 25.4 micron thickness at the operating voltage of the capacitor. Ordinarily, the prior chlorinated diphenyl impregnants, PCB's, could be refined to much lower levels, i.e., below 1.0%, but lower levels have not been found to be practical as the impregnants of this invention. This undesirable situation could cause the fluid of this invention to be discarded as an effective fluid. However, it has been found that polypropylene is an absorber of impurities from the impregnants of this invention and consequently higher power factor fluids of this invention may be employed in polypropylene film capacitors.

The capacitor impregnation process must be carried out at reduced temperatures to retain the highly volatile TCB in the impregnant and in the capacitor. A preferred capacitor temperature range is from about 50° C. to 80° C., and a preferred fluid temperature is less than about 60° C.

What is disclosed is a process of improving the dielectric properties of an alkyl branched chain phthalate ester. The corona extinction voltage and capacitance of an AC capacitor, as described, are also improved by using a refined mixture of chlorinated benzene, an epoxide and a phthalate ester at a dissipation factor of less than about 2% when the capacitor is impregnated at a temperature in the range of from about 80° C. to 50° C., with the impregnant mixture at a temperature of less than about 60° C., and then sealing said capacitor. After sealing, the capacitor is placed in an oven or passes through a heating process where its internal temperature is raised to and maintained above about 80° C. for a period of about 8 or more hours. This is referred to as a heat soak. The DK of the impregnant remains higher than the DK of its ester and benzene components, and the corona extinction voltage is higher than that of the same impregnant, but without the trichlorobenzene.

For the use of the preferred embodiments of this invention, the particular features desired, of increased dielectric constant, a higher corona extinction voltage, and increased flame retardance, can all be programmed to the desirable function of the capacitor.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

1. C. P. Smyth, "Dielectric Behavior and Structure", page 23, McGraw-Hill, 1955.

$$\frac{(f-1)(2f+1)}{9f} \frac{M}{d} = \frac{4\pi N}{3} \alpha_0 + \frac{\overline{M}\overline{M}}{3KT}$$

Where f is the dielectric constant, M is the molecular weight, N is the number of molecules per mole, $\alpha$ is the polarizability, $\mu$ is the molecular dipole moment in the liquid, $\overline{\mu}$ is the sum of the molecular dipole moment and the moment induced as the result of hindered rotation, and d is the density.

2. A. Von Hipple, "Dielectrics and Waves", page 231, John Wiley & Sons, 1954.

$$\text{Log } k_m' = \theta_1 \log k_1' \times \theta_2 \log k_2'$$

Where km' is the dielectric constant of the mixture $k_1'$ and $k_2'$ and $\theta_1$ and $\theta_2$ are the volume ratios of the components.

What is claimed is:

1. A fluid comprising a mixture of about 5 percent to about 40 percent by volume of a halogenated benzene and about 60 percent to about 95 percent by volume of an alkyl branched chain phthalate ester, said fluid having a dielectric constant greater than the dielectric constant of either of the halogenated benzene or the alkyl branched chain phthalate ester.

2. The fluid of claim 1, further comprising an amount sufficient to stabilize the mixture, of an epoxide.

3. The fluid of claim 1, further comprising an amount sufficient to prevent or reduce oxidation of the components of the mixture, of an antioxidant.

4. The fluid of claim 1, wherein the halogenated benzene is trichlorobenzene.

5. The fluid of claim 4 wherein the trichlorobenzene is 1,2,4-trichlorobenzene.

6. The fluid of claim 4, wherein the trichlorobenzene is 1,2,3-trichlorobenzene.

7. The fluid of claim 4, wherein the trichlorobenzene is a mixture of 1,2,4-trichlorobenzene and 1,2,3-trichlorobenzene.

8. The fluid of claim 1, wherein the phthalate ester is di-2-ethylhexylphthalate.

9. The fluid of claim 1 consisting essentially of about 60 percent by volume of di-2-ethylhexylphthalate and about 40 percent by volume of trichlorobenzene.

10. The fluid of claim 1 wherein the dielectric constant of the halogenated benzene is above about 4.0; the dielectric constant of the alkyl branched chain phthalate ester is above about 4.0; and the dielectric constant of the mixture is at least 0.25 times higher than the dielectric constant of either the halogenated benzene or the alkyl branched chain phthalate ester.

11. A method of increasing the dielectric constant of an alkyl branched chain phthalate ester having a dielectric constant above about 4.0, comprising, mixing an effective amount of halogenated benzene having a dielectric constant above about 4.0 with the alkyl branched chain phthalate ester whereby the measured dielectric constant of the alkyl branched chain phthalate ester having the halogenated benzene therein, is at least 0.25 times higher than the dielectric constant of either the halogenated benzene or the alkyl branched chain phthalate ester.

12. The method of claim 11 wherein about 5.0% to about 40.0% by volume of halogenated benzene is mixed with the alkyl branched chain phthalate ester.

13. The method of claim 11 wherein the halogenated benzene is 1,2,4-trichlorobenzene.

14. The method of claim 11 wherein the halogenated benzene is 1,2,3-trichlorobenzene.

15. The method of claim 11 wherein the halogenated benzene is a mixture of 1,2,4-trichlorobenzene and 1,2,3-trichlorobenzene.

16. The method of claim 11 wherein the phthalate ester is di-2-ethylhexylphthalate.

17. The method of claim 11 wherein about 5.0 percent to about 40.0 percent by volume of trichlorobenzene is mixed with about 60.0 percent to about 95.0 percent by volume of di-2-ethylhexylphthalate.

18. The method of claim 11 wherein the halogenated benzene is trichlorobenzene, and the alkyl branched chain ester is di-2-ethylhexylphthalate, and about 5.0 percent to about 40.0 percent by volume of trichlorobenzene consisting essentially of about 70 percent by volume of 1,2,4-trichlorobenzene, about 25 percent by volume of 1,2,3-trichlorobenzene and about 5 percent by volume impurity, is mixed with about 60.0 percent to about 95.0 percent by volume di-2-ethylhexylphthalate.

19. A method of controlling the dielectric constant of a blend of a halogenated benzene having a dielectric constant above about 4.0 and an alkyl branched chain phthalate ester having a dielectric constant above about 4.0, comprising, varying the ratio of the halogenated benzene in the blend relative to the amount of alkyl branched chain phthalate ester therein, said blend having a dielectric constant greater than the dielectric constant of either of the halogenated benzene or the alkyl branched chain phthalate ester.

20. The method of claim 1 wherein the ratio of trichlorobenzene is varied between about 5.0 percent and about 40.0 percent by volume relative to the volume of the alkyl branched chain phthalate.

21. The method of claim 19 wherein the dielectric constant of the halogenated benzene is between about 4.0 and about 6.0; the dielectric constant of the branched chain phthalate ester is between about 4.0 and about 6.0; and the measured dielectric constant of the blend is at least 0.25 higher than the dielectric constant of either the halogenated benzene or the alkyl branched chain phthalate ester.

22. The method of claim 19 wherein the halogenated benzene is 1,2,4-trichlorobenzene.

23. The method of claim 19 wherein the halogenated benzene is 1,2,3-trichlorobenzene.

24. The method of claim 19 wherein the halogenated benzene is a mixture of 1,2,4-trichlorobenzene and 1,2,3-trichlorobenzene.

25. The method of claim 19 wherein the alkyl branched chain phthalate ester is di-2-ethylhexylphthalate.

26. The method of claim 19 wherein the halogenated benzene is trichlorobenzene and the alkyl branched chain phthalate ester is di-2-ethylhexylphthalate, and the ratio of trichlorobenzene consisting essentially of about 70 percent by volume of 1,2,4-trichlorobenzene, about 25% by volume of 1,2,3-trichlorobenzene and about 5 percent by volume impurity, is varied between about 5.0 percent and about 40.0 percent by volume relative to the volume of the di-2-ethylhexylphthalate.

27. The method of claim 19 wherein the blend further comprises an amount sufficient to stabilize the mixture, of an epoxide.

28. The method of claim 19 wherein the blend further comprises an amount sufficient to prevent or reduce oxidation of the components of the mixture, of an antioxidant.

* * * * *

UNITED STATES PATENT AND TRADEMARK OFFICE
CERTIFICATE OF CORRECTION

PATENT NO. : 4,482,478
DATED : Nov 13, 1984
INVENTOR(S) : David G. Shaw

It is certified that error appears in the above-identified patent and that said Letters Patent are hereby corrected as shown below:

Column 12, line 57: Last portion of formula should read -- $\frac{\mu\bar{\mu}}{3KT}$ Column 12, line 62: "$\mu$" should read -- $\bar{\mu}$ --

Column 14, claim 20, line 1: claim "1" should read -- 19 --.

Signed and Sealed this

Ninth Day of July 1985

[SEAL]

Attest:

DONALD J. QUIGG

*Attesting Officer*   *Acting Commissioner of Patents and Trademarks*